United States Patent [19]
Eckstein

[11] Patent Number: 5,906,336
[45] Date of Patent: May 25, 1999

[54] METHOD AND APPARATUS FOR TEMPORARILY INTERCONNECTING AN UNMANNED AERIAL VEHICLE

[76] Inventor: Donald Eckstein, 5123 Bradfield Dr., Annandale, Va. 22003

[21] Appl. No.: 08/970,559

[22] Filed: Nov. 14, 1997

[51] Int. Cl.⁶ .................................................. B64D 39/00
[52] U.S. Cl. ........................................................ 244/135 A
[58] Field of Search ............................. 244/1 TD, 135 A, 244/139, 161, 3.13, 3.14, 3.16, 3.17

[56] References Cited

U.S. PATENT DOCUMENTS

| | | | |
|---|---|---|---|
| 2,716,527 | 8/1955 | Latimer-Needham | 244/135 A |
| 2,953,332 | 9/1960 | Cobham et al. | 244/135 A |
| 2,964,543 | 7/1960 | Gordon et al. | 244/135 A |
| 3,108,769 | 10/1963 | Hieber | 244/135 A |
| 4,763,125 | 8/1988 | Newman | 244/135 A |
| 4,763,861 | 8/1988 | Newman et al. | 244/135 A |
| 5,109,345 | 4/1992 | Dabney et al. | 244/161 |
| 5,131,438 | 7/1992 | Loucks | 244/135 A |
| 5,340,060 | 8/1994 | Shindo | 244/161 |

*Primary Examiner*—Charles T. Jordan
*Assistant Examiner*—Charles R. Ducker, Jr.
*Attorney, Agent, or Firm*—Robert M. Downey, P.A.

[57] ABSTRACT

An apparatus and method for aerial refueling of an unmanned aerial vehicle (UAV) wherein a laser receiver/transmitter on a target device towed by a host aircraft projects a reticle pattern aft of the host aircraft and a laser receiver/transmitter on a probe of the UAV is activated as the UAV is moved within the projected reticle pattern. Thereafter, a rangefinder guides the UAV towards the host aircraft until the laser transmitter/receiver of the UAV is aligned and boresighted with the laser transmitter/receiver of the host aircraft at which time the mode of the laser transmitter/receiver of the UAV alternates between a rangefinder mode and a modulation data link mode to transmit vital information concerning the UAV to the host aircraft. The probe on the UAV continues to move toward the drogue until the probe establishes contact within a receptacle structure of the drogue and is coupled thereto.

12 Claims, 3 Drawing Sheets

METHOD AND APPARATUS FOR TEMPORARILY INTERCONNECTING AN UNMANNED AERIAL VEHICLE

FIELD OF THE INVENTION

This invention is of a method and apparatus to interconnect an airborne host aircraft and an unmanned aircraft for various purposes, such as the refueling of the unmanned aircraft to increase its endurance or loiter time aloft or the purpose of towing an unmanned aircraft to a predetermined location to be released for independent flight.

BACKGROUND OF THE INVENTION

Aerial Refueling Background:

Aerial refueling has significantly extended the range and mission effectiveness of modern military aircraft. Either of two refueling methods are used: the flying boom/receptacle method or the probe/drogue method.

The flying boom/receptacle method is usually used on one relatively heavy aircraft (called a receiver) at one time. Fuel flow takes place at a high rate so that a host can deliver to a receiver and it can take on loads of 100,000 lbs. or more in a matter of minutes. Due to the relatively large size of the host aircraft and the relatively heavy receiver, they have relatively slow rates of response. Thus, the boom operator of a tanker using the boom/receptacle method performs the precision "flying" while the pilot of the receiver aircraft maintains a formation position underneath and behind the tanker within a small "tolerance," usually about 10 feet.

The probe/drogue method, which is of particular concern in this patent, is a somewhat simpler technology than the flying boom/receptacle method because it requires a greater amount of piloting skill. In performing this method, a tanker aircraft unreels a hose approximately 50–100 feet behind the tanker. At the end of the hose is a funnel-shaped "basket" about three feet in diameter called a drogue. The center of the drogue has a refueling receptacle into which the probe of a receiver aircraft is inserted. When the probe is inserted into the drogue, fuel flows from the tanker into the receiver aircraft. Depending on the model of tanker aircraft, up to three drogues can be extended from the tanker and three receiver aircraft can be refueled at the same time, one from each of the opposite wingtips and one from a centerline refueling station. Flow rates of the probe/drogue method are less than the flying boom/receptacle method, but because it is used primarily with relatively lightweight, fighter sized aircraft, only small fuel offloads (i.e. 2,000 to 20,000 lbs.) at any single refueling are typically required, vice the 50,000 lb. plus offloads typically required by larger bomber or transport aircraft.

The probe/drogue refueling method is the more flexible method of the two refueling in flight methods since the probe/drogue method employs a pod that can be easily uploaded on a variety of aircraft, vice the flying boom method which requires a very large dedicated aircraft. In fact, it is even possible to install a refueling pod on a fighter, which then can refuel its wingman on a combat mission. In the probe/drogue method of refueling, C-130s, KC-135 and KC-10 class aircraft are typically used because of their endurance and fuel offload capabilities (i.e., 50,000 to 100,000 lbs.) depending on the mission radius and orbit time between the first and last offloads. The one current exception to this is the use by the U.S. Navy of the KA-6 as a host, which is a slightly modified A-6 attack aircraft. These tankers are used to "top off" formations once they reach altitude on the egress or provide an extra landing reserve prior to landing on an aircraft carrier.

Aerial refueling using the probe/drogue method is a demanding task for pilots. It requires visually observing the tanker in daylight or in darkness. In the case of darkness, special lighting on the tanker provides cues to visual position and depth. In operation, a receiver aircraft is maneuvered so that a probe, about six inches wide, is inserted into the mouth of a target drogue which is about three feet wide, to establish a connection with a receptacle structure and to maintain it until the refueling task is completed, which is normally between one and five minutes. Performance of this method is complicated by the fact that an aircraft's flying qualities change while it takes on fuel. The increase in weight requires the pilot of the receiver aircraft to increase pitch and power to generate more lift to maintain altitude and airspeed and maintain the probe/drogue connection. Another complication is that, when refueling a receiver aircraft, host aircraft actually orbit so that during all or part of the orbit, the host is in a banked turn, while the receiver must maintain its position relative to the tanker. It will be appreciated that, since there is a loss of lift in a turn, both the pitch and power of the receiver aircraft must be increased to maintain airspeed and altitude.

Background of Long Range/Endurance Unmanned Aerial Vehicles:

Quite apart from the technology of aerial refueling is the technology surrounding unmanned aerial vehicles (UAVs), sometimes referred to as remotely piloted vehicles. UAVs have been used as target drones for ground based surface to air missiles (SAMs), anti-aircraft artillery (AAA), and air to air missiles. As this technology has developed, UAVs were designed to simulate the capabilities of modern fighters or bombers as to speed, altitude, and endurance characteristics; for example, an unmanned aircraft may have a cruise speed of 400–500 mph, a cruise altitude of 20–40,000 ft., and at least an hour or more endurance.

Background of Sensor Technology:

Recently, a small number of these drones, unmanned aircraft or UAVs, have been fitted with sensors used to collect intelligence. Within the UAV spectrum is the typical battlefield reconnaissance UAV. These vehicles typically weigh 500 to 2,000 lbs. and used small gasoline powered engines with propellers and include a sensor package. The sensor packages often cost as much or more than the UAV. These packages can include various types of sensors: electro-optic (i.e., video camera), infrared (thermal imaging), radar (imaging), and signals intelligence (i.e., radio receivers). The sensors may be used one at a time or as a combination (depending on the payload and type of UAV). The intelligence collected is relayed in near-real-time (e.g. seconds or minutes from collection to exploitation) from the UAV to a ground site, via line of sight, or relayed transmission (which can use another UAV, aircraft, or satellite for the retransmission or data link).

As reconnaissance UAVs have continued to be developed to meet more demanding operational needs, an emphasis has been placed on increasing and improving payload (additional and higher quality sensors), endurance (more loiter time over target), range (which allows greater operational flexibility in chosing basing), stealth (harder to acquire and shoot down), and cruise speed (decreases time from take off to collection orbit).

The current state of the art in unmanned reconnaissance drones are the Tier 2 plus Teledyne Ryan "Global Hawk" and the Tier 3 minus Lockheed "Darkstar". The Global Hawk emphasizes payload, range, and endurance (2,000 lb. payload, 3,000 mile range, 24-hour loiter over target) while the Darkstar is very stealthy and has more limited operational characteristics (1,000 lb. payload, 500 mile range, 8-hour loiter over target). A major limitation of these (and all) UAVs is that despite the elimination of onboard aircrew members, a potential mission endurance of days or even weeks cannot be realized due to the limited fuel load carried at the time of takeoff.

SUMMARY OF INVENTION

This invention provides an apparatus and methods for systems in one embodiment for aerial refueling of unmanned aircraft whereby their endurance or loiter time over a target can be greatly increased and in another embodiment for saving a crippled unmanned aircraft by towing it to a predetermined location to be released to glide to a landing. More broadly, it is an apparatus and a method for interconnecting a UAV receiver in flight to a host or tanker for various purposes, such as refueling the UAV.

Method for Aerial Refueling of UAV

Aerial refueling in general is demanding. Aerial refueling of a UAV being remotely flown is even more demanding because it involves the time lag associated with uplinking and downlinking flight commands from a remote location. Nevertheless, refueling of a UAV has many advantages. One is that it could increase the operational effectiveness (i.e., loiter time over target) by a factor of two, four, or even ten or more. Also, because the small size of UAVs, their high cost, and the importance of stealth characteristics in both current and future designs, it is an object of this invention to provide an automatic aerial refueling system for UAVs which uses current aerial refueling technology, uses simple, small, low cost components developed in sensor technology and is inherently stealthy while refueling takes place.

In the present invention, the probe/drogue method of aerial refueling is employed when performing interconnection of the UAV in flight and a host or tanker. The method of this invention uses two sets of laser transmitter/receivers (LTRs), one attached to the target refueling drogue and one attached to the refueling probe. These LTRs are mounted in the corresponding physical positions on the probe and the drogue so that, in use, they align one with the other, exactly (i.e. are boresighted) when the probe is inserted into the drogue. The LTRs are tuned to a specific wavelength or frequency outside of the visible spectrum, so that these emissions can only be detected if a laser detector sensitive to that frequency is boresighted on LTR. The LTR on the refueling drogue is fitted with a special projection lens with a graduated reticle pattern like that found on a rifle scope. An alternative method of generating a target pattern is for the projection lens to shift the laser frequency during the expansion, so that the frequency increases or decreases toward the outside of the projection cone and increases or decreases toward the inside of the projection cone. This can also be accomplished by using highly directional light signals of varying frequencies. When turned on, the drogue LTR reticle projector sends out a laser beam that expands at a specific ratio for example, 1:10. That is, the LTR reticle beam is one foot in diameter at a range of 10 feet, two feet at 20, 10 feet at 100, 100 feet at 1000, and 500 feet in diameter at a range of 5000 feet.

During a refueling operation, the UAV receiver is flown remotely using its electro-optical, infrared, or radar sensor(s) to a point one to several thousand feet directly behind the tanker, which has its LTR activated and projecting the reticle pattern. At this point, the LTR on the UAV is active in the receive only mode. Its first step of the method is to confirm that it is located somewhere inside the projected laser reticle beam that is anywhere from 100 to 1000 ft. in diameter, depending on the expansion ratio selected and the UAV distance behind the refueling drogue. Once it has confirmed that it is within the beam, it will use the reticle pattern (or the alternative method of frequency band shifts) and its automatic target recognition algorithm to determine exactly where in the project laser reticle beam it is located. Once this is determined, the UAV autopilot will engage and simultaneously accomplish two tasks. First, it will activate the UAVs LTR in the rangefinder mode to confirm the UAVs distance from the tanker drogue. Second, it will steer toward the centroid of the laser reticle beam, which, depending on the expansion ratio and the reticle pattern used, may be anywhere from 50 to 500 feet in diameter. This resembles an instrument landing system (ILS) approach of an aircraft, the closer the UAV gets to the drogue, the smaller the beam and "tighter" the approach.

Once the UAV is established in the tanker's LTR reticle beams centroid and the UAVs LTR rangefinder has determined the range from the refueling drogue, the UAVs autopilot commands the aircraft to accelerate and approach the drogue at a slow, predetermined rate. At this point, the UAVs LTR goes into a timeshare mode, where part of the time the transmitter operates in the rangefinder mode, and another part of the time it operates in a Pulse Code Modulation (PCM) data link mode to transmittal vital UAV info (altitude, heading, airspeed, rate of closure, fuel status, fuel onload desired, major systems status, etc.) to the tanker. This information allows the tanker to confirm the UAVs position and the status of its approach and critical systems. At some point during the UAVs approach, the tanker LTR also shifts into the PCM data link mode to transmit the tanker's altitude, heading, airspeed, and systems status to the UAV. This PCM data confirms to the UAVs autopilot that the LTR data link has been established prior to probe contact with the drogue. Should this data link be interrupted, the UAV autopilot would automatically hold "in position" for a predetermined time period until the data link was re-established. Should this interruption exceed a certain predetermined time, the UAV autopilot would abort the approach and withdraw to a safe distance behind the tanker. To increase the tanker crew's situational awareness, a thermal imaging camera is mounted on the tanker drogue to monitor the UAVs automatic approach. This image is displayed in the tanker's cockpit, with the UAVs flight data overlaid on the image, along with that of the tanker. Any deviation from a safe approach would be immediately apparent, allowing the tanker to command an abort via the PCM data link and to maneuver away from the UAV during the abort while keeping the vehicle "in sight."

This LTR PCM data link is critical to the safety of the automatic UAV refueling. During the initial laser reticle beam capture and approach, it allows both the tanker crew members and the UAV autopilot to know with great precision where each is located. Once the approach is consummated however, this data link is the only way that the UAV can maintain the proper formation position with the tanker since the refueling coupling eliminates the relative position data (from the tanker LTR reticle beam) that the UAVs autopilot needs to maintain station on the tanker. Transmission of the tanker's autopilot data directly to the UAVs autopilot will allow a "coupled" formation to be flow long enough to complete the required fuel offload, probably in one to five minutes.

The method of this invention is an inherently stealthy system since it does not emit radio frequencies at any power level. Laser emissions are inherently stealthy since laser beams are highly directional and can normally only be detected if the receiver is in the direct line of sight. Laser beams are also frequency specific, so that a potential laser detector would have to be capable of detecting the specific frequency being transmitted. Also, since refueling orbits normally occur at 20,000 to 35,000 feet, it would be difficult if not impossible for a ground site to detect the laser emission. While the projected reticle beam is much wider than a normal laser beam, projecting the beam also reduces its strength (and detectability). Also, the closer the UAV gets to the tankers LTR, the more of the reticle beam is blocked by the UAVs fuselage. Once the UAV gets to within a couple of hundred feet from the tanker's drogue, all or almost all of the beam is blocked from detection.

On non-stealth UAVs, a probe system can be easily added to the external fuselage. On stealth UAVs, a retractable probe system can be incorporated into the vehicle's design so as to not increase the electromagnetic signature of the vehicle during the operational (i.e. non-refueling) portion of the mission. While either type of installation would probably add at least one hundred or more pounds to the UAV, this weight increase is more than compensated for by only one aerial refueling. Without an aerial refueling, the weight and/or aerodynamic drag increase of either type of probe installation would shorten mission duration by 10–20 percent depending on the specific airframe, mission, and operational circumstances.

The method or system disclosed above broadly is of a way and means to interconnect a tanker aircraft and a receiver which is a UAV for the specific purpose of refueling the UAV; however, the method or system may be employed to lock the UAV to the tanker or moth e r aircraft so that it may be towed instead of refueled.

Method of Towing a UAV:

The method or system for in flight interconnection of a host aircraft and another probe carrying unmanned aircraft for towing the latter includes the use of a second or alternative type drogue basket design, one with a means of "locking" the UAV probe in the drogue basket. This feature would not normally be used during regular refueling missions. It would instead be used should the UAV suffer a major engine or fuel system failure during a mission. A locking drogue design would allow the tanker aircraft to "tow" the UAV back to an airfield where it could make an unpowered landing. (This assumes that the failure happened at an altitude, which allows the host tanker to "capture" the UAV prior to its impact with the ground). This is very "doable" since the Tier 2 plus (Global Hawk) and Tier 3 minus (Dark Star) UAVs fly at 45–65,000 ft. and have excellent to outstanding unpowered flight endurance characteristics. Since these two airframes are produced in limited number and cost some $10 to $20 million each (a major portion of this cost is due to UAVs collection sensor and communication systems), this "tow-back" feature is one that could pay for itself with a single UAV "save." These UAVs have a very high lift to drag ratio and require only a modest amount of "thrust/pull" to stay airborne (vice the large amount of thrust required for a fighter, tanker, or transport to take off fully loaded). The Dark Star has an engine thrust rating of about 3,000 lbs., while the Global Hawk is about 6,000 lbs. These are the "maximum" ratings required for takeoff; the thrust/pull required to maintain altitude with a reduced fuel load is about half the takeoff maximums. The required "towing" strength could be achieved by incorporating a strengthening structure, or reinforcing the hose element to add to its tensile strength, such as using Kevlar, in the refueling hose outer cover and reinforcing the hose reel anchor mechanism in a pod. Pods are normally installed on jettisonable pylons so, if the drogue locking mechanism jammed in the locked position and the receiver aircraft could not be properly released, the pod could be jettisoned along with the towed UAV to prevent potential damage to the tanker from landing with a UAV "in tow."

There are several major advantages to this system. First, while the high lift to drag ratio of the Global Hawk gives it both exceptional range and altitude capabilities, if it has engine, fuel, or avionics/communications problems while self-deploying from a base to an overseas location (over open ocean), there is a very high probability that the airframe will be lost.

The method or system of this invention provides a third method of communication with a UAV (in addition to the satellite and ground based VHF/UHF communication links, the latter of which is only good for 150 nautical miles) should the primary two incur failures. While these UAVs most likely have an emergency backup navigation mode which uses a GPS receiver and autopilot to return to a preprogrammed base, the digital data link of this method or system offers a much more flexible backup system. Should primary communications be lost or other major system problems develop, the system allows a "chase aircraft" (which could be any aircraft with the system installed) to intercept the UAV and determine the airframes limitations and capabilities. If the primary problem is a loss of communications, a backup mode of the UAVs flight control system would use the system to fly in formation 10 to 500 feet behind the drogue (and the chase aircraft). The chase aircraft would fly an approach to the nearest suitable base where it would abort a landing just short of touchdown and "release" the UAV 50 ft. above and just past the runway threshold. This option is very appealing since the UAVs flying status is known prior to flying over populated areas and the chase aircraft is electronically "towing" the UAV in for a controlled landing. This allows the UAV to safely penetrate controlled airspace used by manned civilian aircraft, an option not available during either normal or emergency UAV operations. This option increases the number of divert or emergency landing sites by literally thousands, since normal UAV operations are required to avoid civilian airspace and major populated areas for safety (and liability) reasons.

Since the commonly used UAVs are single engined, any major engine, fuel or electrical system problem normally results in the loss of the airframe. This system, on the other hand, will allow a chase aircraft to determine the cause of the problem and whether the airframe can continue powered flight. Should the UAV lack the unpowered range to make the nearest possible divert airfield, the locking drogue basket feature would allow the UAV to be towed to the nearest divert field. This feature would be especially valuable for the Dark Star, since it normally operates at a lower altitude and does not have as long of an unpowered range as the Global Hawk. The Dark Star is also specially designed to covertly penetrate into hostile airspace, and any airframe loss within this territory could significantly compromise its capabilities. Should a major failure occur, a fighter equipped with the system components could tow the Dark Star to friendly airspace where it would land at the closest airfield. The value of the tow-back feature of this method is directly proportionate to the value of a specific UAV and its unpowered range. As UAV costs increase and their unpowered range decrease, which is the well-established current trend, this method of towing and recovering UAVs at alternate landing sites will become an increasingly valuable option from both an operations effectiveness and replacement cost perspective. While some applications of this design may involve weight and drag/pull capacities that may require some structural changes to the host aircraft, the towing method is cost effective up to the weight/drag/thrust required ratio represented by the Global Hawk—an upper design point that will probably hold true for most near term UAVs.

While this system can be installed on almost every type of aircraft currently being used as a drogue equipped tanker, many of its advantages will be most fully realized when it is installed on fighter-attack type aircraft. While flying two aircraft of any type in close proximity to each other is inherently high risk, it is more so when one is very large, heavy, and slow to respond as are KC-130, KC-135, and KC-10 tanker-transports. Fighter-attack aircraft designs possess much greater speed and maneuverability and can quickly abort a refueling if required. These same characteristics also allow them much greater flexibility in performing a rendezvous, in that they can intercept the UAV and position themselves in front of the UAV as opposed to tanker-transports, which in most cases would have the UAV slowly approach from the rear hemisphere as they orbited a position. The front hemisphere intercept capability of fighter-attack aircraft is also aided by their potential supersonic speed and aircraft intercept radar systems. These capabilities are invaluable for shortening an intercept in cases where the UAV has suffered a major system malfunction and lost power or communications with its ground controllers. These aircraft are also capable of flying at the higher altitudes that advanced UAV systems like Dark Star and Global Hawk operate at, increasing the "window of opportunity" in which to perform either refueling or recovery operations on either a routine or emergency basis.

When conducting towing operations, fighter-attack aircraft have two major safety advances over tanker-transports. Their drogue systems are contained within pods which can be jettisoned should the lockable probe become jammed in the drogue refueling receptacle. This option does not apply to drogues mounted on the end of refueling booms (like the KC-135 or KC-10), or hose and reel system installed within the aircraft fuselage (like the KC-10). Fighter-attack aircraft are also equipped with ejection seats, which gives their crew members an additional safety reserve and escape option when performing either refueling or towing operations.

In accordance with the foregoing Summary and the objects set forth and inherent in the Summary, the method and apparatus of the invention will be described on reference to the accompanying drawings.

DETAILED DESCRIPTION OF THE PREFERRED EMBODIMENTS

Figure 1A:
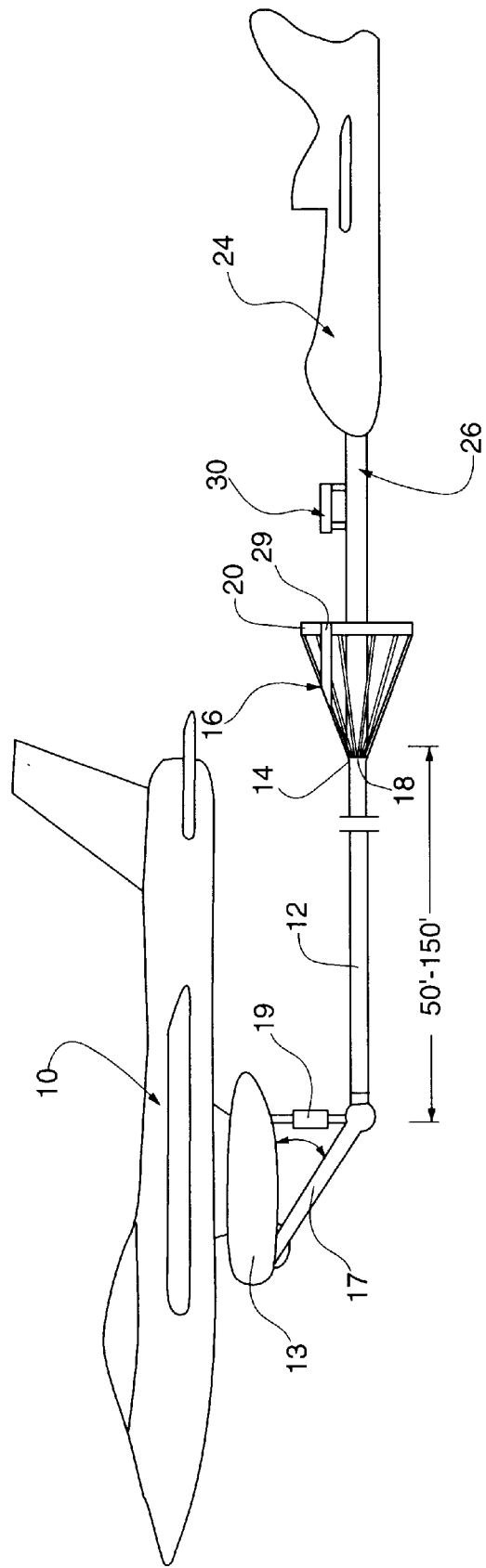
FIG. 1A is a side elevation schematic view illustrating aerial refueling between a host aircraft and an unmanned aircraft using the apparatus of the invention.
Figure 1B:
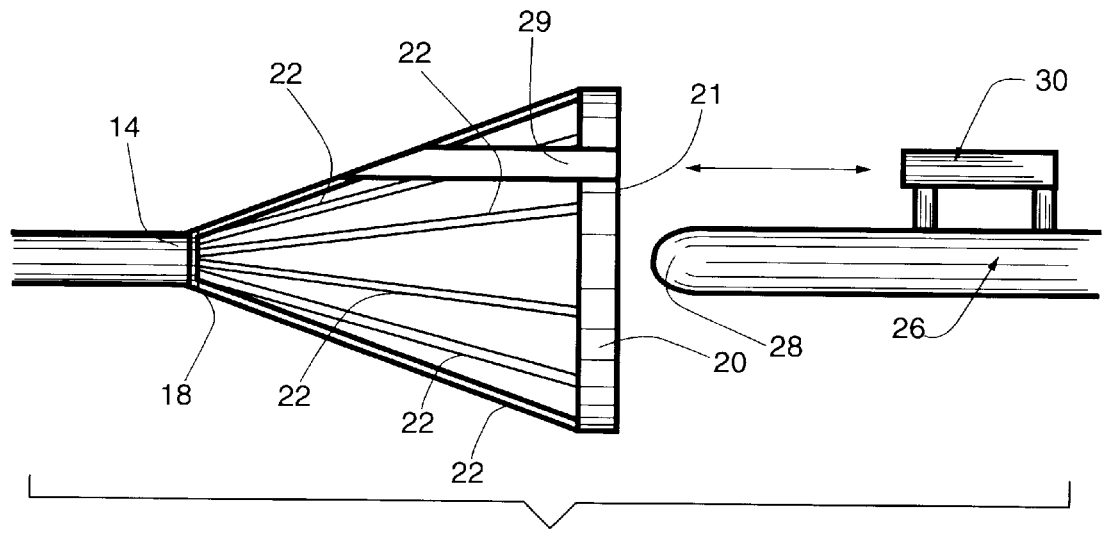
FIG. 1B is an isolated view illustrating the primary components of the refueling drogue and refueling probe of the present invention.
Figure 2:
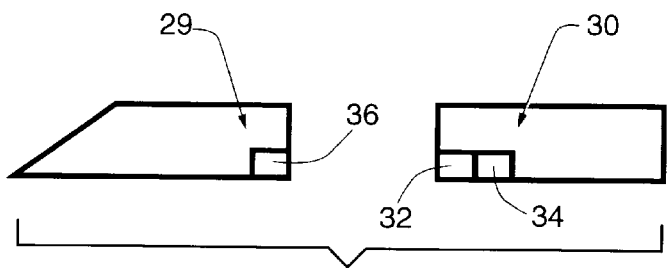
FIG. 2 is an isolated schematic of the laser transmitter/receivers carried on the drogue and refueling probe.

In the attached drawings, there is shown schematically or pictorially a host aircraft 10 which trails a deployed hose 12 connected at its proximal end in fluid communication with a fuel pod 13 in a host aircraft and, at its distal end zone 14, to a trailed target drogue 16 through a tubular receptacle structure 18. In a preferred embodiment, the hose 12 connects at its proximal end to an extendable arm 17 leading from the fuel pod 13. The extendable arm may be a rigid pipe which pivots from the nose of the pod 13 and lays flat under the pod during takeoff and landing of the aircraft 10. A hydraulic cylinder 19 may be used to extend (lower) and retract the arm 17. The drogue 16 has a distal ring 20 with a rim 21 and a plurality of equi-angularly spaced common length drogue support spokes, such as 22, which interconnect the rim and receptacle structure. Also shown in the drawings is an unmanned aircraft 24 which has a probe 26 which extends distally along its flight path which probe is sized and configured for its distal end 28 to be telescopically received in the receptacle structure of the drogue.

Figure 3:
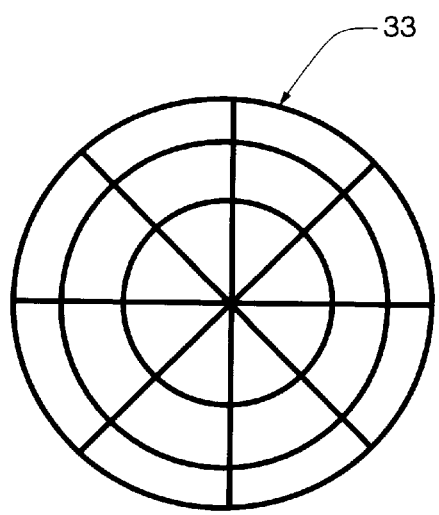
FIG. 3 is a rear elevation view of the reticle pattern from the host aircraft to aid in receivingly interconnecting to a receiver aircraft.

The drawings illustrate a pair of laser transmitter/receiver means; one 29 carried by a drogue and the other one 30 carried by the probe. The laser transmitter/receiver means are companionately sized and located relative to one another for confronting relation, one with the other, on an approach of an unmanned aircraft 24 to the host aircraft 10. More particularly, the probe 26 of the unmanned aircraft is structured for receipt into telescopic or coupled relation with the drogue 16 of the host aircraft. The laser transmitter/receiver 30 of the unmanned aircraft is provided with a sensor means 32 to point to a laser generated reticular pattern 33, see FIG. 3, and includes a target recognition algorithm 34 to determine where in a reticular pattern the probe is located. It will be appreciated that as the unmanned aircraft approaches the host aircraft, the laser transmitters 29 and 30 will be "boresightedly" aligned. The laser transmitter/receiver 29 of the target drogue of the host aircraft is provided with a means 36 to generate a reticular pattern which expands in a graduated reticle pattern 33 aft of the target drogue of the host aircraft 10 (as seen in FIG. 3). This laser transmitter/receiver 29 includes a pulse code modulation data link mode to transmit vital information about the unmanned aircraft 24 such as its altitude, heading, airspeed, rate of closure, fuel status, fuel onload desired, and the status of the major systems. The laser transmitter/receiver 30 of the unmanned aircraft 24 includes a rangefinder means, a timeshare means, and a pulse code modulation data link mode. The operation of the structure is as described hereinbefore for either a refueling operation or a towing operation.

Figure 4:
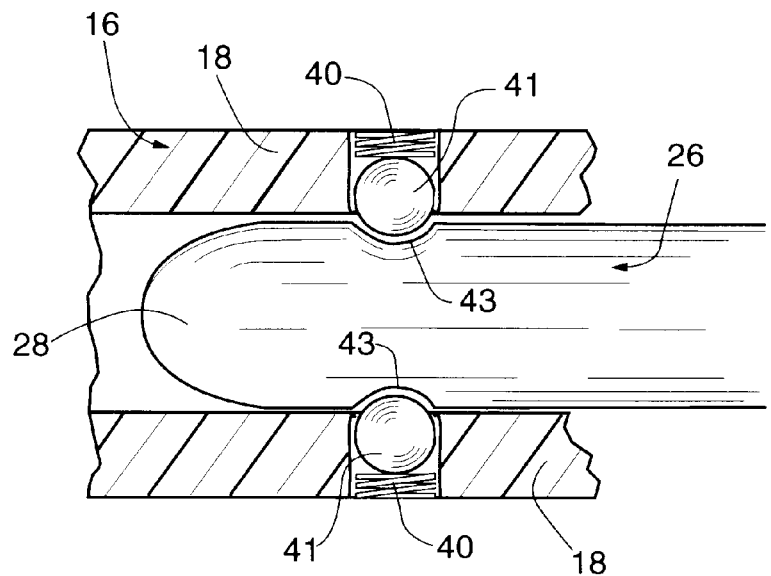
FIG. 4 is an isolated side view in partial section, illustrating a locking mechanism to maintain interconnecting of a host and receiver aircraft for towing purposes.
Figure 5:
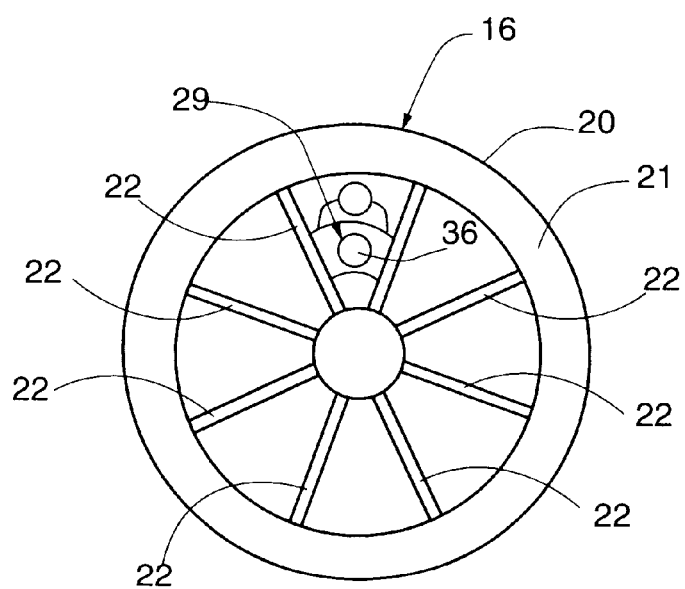
FIG. 5 is a rear elevation view of the refueling drogue as seen from the unmanned aircraft when aft of the drogue.

For use in the towing method, locking means are provided to releasably lock the host aircraft and towed aircraft. Locking means to interconnect a probe in a tubular member telescopically are too numerous to detail, but many of which are equivalents and well known to those in this and many arts are contemplated for use in connection with the present invention. A representative locking means is seen in FIG. 4, which includes a spring 40 and a biased ring or ball member 41 in the receptacle structure 18 which is urged into an annular groove 43 in the probe 26. When the probe is forcibly inserted into the receptacle structure, the lock takes place. The spring pressure that engages the locking mechanism can be manually or automatically electro-mechanically engaged or released in the cockpit of the host aircraft. This locking means is in no way intended to be limiting in light of the many such locking means known.

It will be appreciated by those in the art that some of the various components described herein are available in the art and the apparatus of this invention is of the combination of those components as described herein and the methods of their use; and that, while the various embodiments of the present invention are disclosed herein and claimed in the following paragraphs and are considered to be preferred and practical embodiments, it is recognized that departures may be made within the spirit and scope of the invention which, therefore, should not be limited except as set forth in the following claims and within the doctrine of equivalents.

Now that the invention has been described,

What is claimed is:

1. The method of interconnecting an airborne host aircraft having a trailing target drogue with a distal ring with a generally circular distalmost rim and a proximal generally circular receptacle structure, and a hose interconnecting the interior of the host aircraft and the receptacle structure of the drogue;

an airborne unmanned aircraft having a probe extending generally along the path of flight of the unmanned aircraft to a distal end and including sensor means to point distally of the probe toward a laser generated reticular pattern and an automatic target recognition algorithm means;

wherein the probe and the drogue are companionately sized and shaped for telescopic receipt of the probe within the receptacle structure of the drogue;

wherein the probe and drogue each include a laser transmitter/receiver means tuned to a specific frequency and wave length outside of the visible spectrum, each laser transmitter/receiver means being generally radially offset a common distance from the centerline of a) the drogue and receptacle structure and b) the probe, for boresighted alignment of the laser transmitter/receivers when the probe is telescopically received in the receptacle structure;

wherein the laser transmitter/receiver means of the unmanned aircraft includes switch means to transfer to and from the transmitter and receiver mode and the receiver mode includes a rangefinder mode adapted to determine when the probe is within the reticle pattern and the distance of the distal end of the probe from the drogue; and automatic target recognition algorithm means to determine exactly where in the projected laser reticle beam the distal end of the probe is located; and wherein the laser transmitter/receiver of the target drogue includes a projection lens means to generate a laser beam which expands aft of the drogue in a graduated cone-shaped reticle pattern of a predetermined expansion ratio and a pulse code modulation data link mode to transmit vital unmanned aircraft information such as altitude, heading, airspeed, rate of closure, fuel status, fuel onload desired, and major systems status to the host aircraft;

said method comprising the steps of:

activating the laser receiver/transmitter means of the target drogue and projecting a reticle pattern expanded aft of the host aircraft;

activating the receiver mode of the laser receiver/transmitter of the unmanned vehicle;

moving the unmanned vehicle relative to the host aircraft until the unmanned aircraft is within the projected laser reticle pattern;

simultaneously,
a) activating the rangefinder mode of the laser receiver/transmitter of the unmanned aircraft, and
b) moving the unmanned aircraft within the pattern toward and into alignment of the laser transmitter/receiver of the unmanned vehicle and the laser transmitter/receiver of the host aircraft;

accelerating the movement of the unmanned vehicle at a predetermined slow rate of approach to the host aircraft;

switching the mode of the laser transmitter/receiver of the unmanned vehicle into a timeshare mode where part of the time the transmitter operates in the rangefinder mode, and another part of the time it operates in the post modulation data link mode to transmit vital information concerning the unmanned aircraft such as altitude, heading, airspeed, rate of closure, fuel status, fuel onload desired, and major systems status to the host aircraft;

establishing probe contact within the receptacle structure of the target drogue; and coupling and maintaining the coupling of the probe and drogue receptacle structure.

2. The method as set forth in claim 1 wherein the probe and drogue are provided with mutually interengaging means to selectively lock the probe of the unmanned aircraft in the receptacle structure of the drogue of the host aircraft to couple the host aircraft and the unmanned aircraft in towing relation of the unmanned aircraft.

3. The method as set forth in claim 1 wherein the sensor means are electro optical means.

4. The method as set forth in claim 1 wherein the sensor means are infrared detection means.

5. The method as set forth in claim 1 wherein the sensor means are radar means.

6. The method as set forth in claim 1 wherein the sensor means are a combination of electro optical means, infrared means, and radar means.

7. The method as set forth in claim 1 wherein the target drogue of the host aircraft includes a thermal imaging camera means to monitor the approach of the unmanned aircraft and wherein the method includes the step of transmitting images from the thermal imaging camera means to the host aircraft and displaying the images in the host aircraft.

8. The method as set forth in claim 7 wherein the image of the thermal imaging camera means displayed in the host aircraft is displayed with flight data of the unmanned aircraft and the host aircraft.

9. A drogue for interconnection with the distal end of a hose, said drogue comprising:

an enlarged, generally circular ring having a distalmost rim;

a plurality of equi-angularly spaced spokes each having a distal end connected to the ring and each converging at a uniform angle to a proximal receptacle structure;

said receptacle structure interconnecting the proximal ends and being adapted to interconnect with the end of a hose; and a laser transmitter/receiver means carried by the drogue including a lens means to generate and transmit a reticular pattern aft of the rim and with said pattern converging to a confluence at said drogue.

10. An elongate probe extending from an aircraft in the general direction of its flight path for interconnecting with a receptacle structure within a drogue, said probe comprising an elongate tubular length and including a laser transmitter/receiver means including switch means to select between the transmitter and receiver mode.

11. A drogue as set forth in claim 9 and a companionate elongate probe extending from an aircraft in the general direction of its flight path for interconnecting with a receptacle structure within a drogue, said probe comprising an elongate tubular length and including a laser transmitter/receiver means.

12. A drogue and companionate elongate probe as set forth in claim 11 including hose means extending from said receptacle structure and mutually intercooperating means on said drogue and probe to engage and releasably lock said probe and drogue together as a unit, said hose means having reinforcing means to increase the strength of said hose means.

* * * * *